Nov. 18, 1941.  O. E. UECKER  2,263,021
DOMESTIC HOT WATER TANK
Filed June 24, 1938
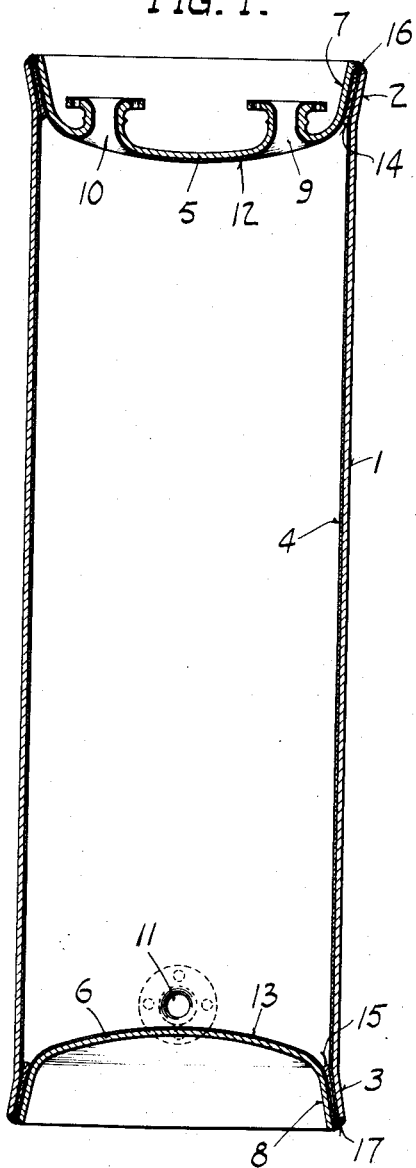
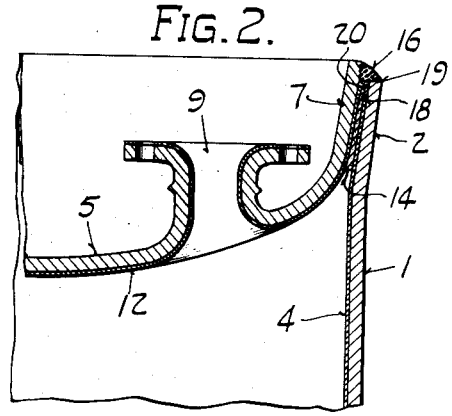
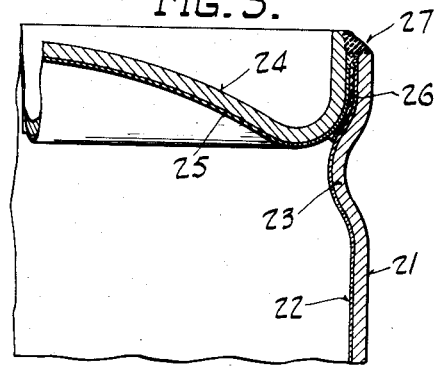
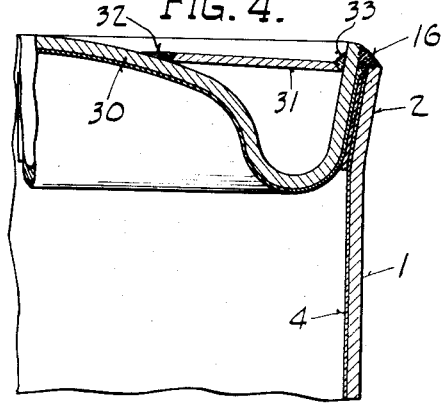
Otto E. Uecker
INVENTOR.
BY Elwin A. Andrus
ATTORNEY.

Patented Nov. 18, 1941

2,263,021

UNITED STATES PATENT OFFICE 2,263,021

DOMESTIC HOT WATER TANK

Otto E. Uecker, Milwaukee, Wis., assignor to A. O. Smith Corporation, Milwaukee, Wis., a corporation of New York Application June 24, 1938, Serial No. 215,651

8 Claims. (Cl. 220—64)

This invention relates to domestic hot water tanks, and has particular relation to the construction of vitreous enamel lined tanks for use in domestic hot water heating and storage, although several features of the invention are applicable to the construction of tanks with various linings and for other purposes.

Most of the commercial hot water tanks today are made either from steel galvanized on the inside, from Everdur or Monel metal or other similar alloy, or from a combination of steel and an Everdur lining known as cladding. The former is the cheapest, but has a very short life. Everdur and Monel metal tanks are reasonably permanent, but are very expensive. The clad construction has not proven successful in its use for electrically heated units, but may be acceptable for storage purposes.

The chief difficulties with lined tanks as distinguished from the alloy tanks has been one of imperfect lining. The construction of galvanized tanks for instance has been such as to make it impossible to properly inspect or repair the lining, and where defects occur electrolytic corrosion sets in and disrupts the lining. It has been the practice in the past to galvanize the tanks after fabrication and inspection thereafter could not determine accurately the perfection of the lining obtained. The construction of clad tanks has been subject to a greater difficulty since at the welded seams the clad lining often melted away during welding with the resultant exposure of the steel. The metal of the alloy lining was of such an electro-potential with respect to iron, that any such defect resulted in a rapid corroding away of the steel. Such defects could not be detected satisfactorily after fabrication.

In order to overcome these difficulties it has been suggested to make the tanks of three parts, the cylindrical body and two heads, and to line the parts prior to assembly so that the lining may be fully inspected. This is in effect the clad construction and is subject to the difficulties of providing a satisfactory permanent water tight joint between the parts without producing defects in the lining.

The principle object of the present invention is to provide a lined tank of three piece construction in which the lining may be fully inspected before assembly and in which the welding of the joints does not injure the lining in any way.

Another object is to provide for a fusing of the lining to cover over the welded joint so that the entire tank is protected by the lining.

Another object is to provide a vitreous enameled three piece construction which insures a liner of high perfection.

Another object is to provide an inexpensive tank of substantially permanent life.

Another object is to provide a sanitary hot water tank which will not in any way injuriously affect or deteriorate the hot water stored therein.

Another object is to provide in a tank with vitreous enamel protected surfaces a combination which will facilitate the assembly of said tank without injury to the enamel.

Other objects will appear hereinafter in connection with the description of the preferred embodiments and modifications thereof.

The invention is illustrated in the drawings in which:

Figure 1 is a longitudinal central section through a hot water tank;

Fig. 2 is an enlarged section through a joint between the upper head and the body;

Fig. 3 is a section similar to Fig. 2 showing a modified joint assembly; and

Fig. 4 is a similar section showing a reenforced type of joint assembly where the head is curbed to provide a larger volume for the tank.

Referring to the drawing, there is shown a range boiler or hot water tank particularly adapted for use in domestic hot water service. The shell 1 of the tank is preferably made of steel or other corrodible material particularly adaptable to give the desired strength characteristics for sustaining the internal pressures involved at a minimum of cost. The shell 1 is preferably made by rolling or otherwise forming a sheet into cylindrical shape and joining the longitudinal edges by welding. A suitable method of joining these edges is by resistance flash welding, the weld areas thereafter being planed or ground to produce a smooth one piece shell of a character well suited for use in the present structure. Annular areas 2 and 3 at the ends of the shell are slightly flared outwardly to receive the heads of the tank. A protective coating 4 is provided for shell 1, which is preferably a vitreous enamel coating of a special composition particularly adapted for use in the storage of hot water. It is desired to have this coating cover the entire inner surface of shell 1, including the flared portions 2 and 3.

Inverted heads 5 and 6 are provided with skirts 7 and 8, respectively, extending outwardly. These skirts are made to conform closely in shape to that of the shell flanges 2 and 3 for a substantial distance. Herein when the term, inverted head, is employed it is intended to mean a head having an outwardly extending skirt, whether the crown of the head curves inwardly or outwardly. Flanged openings 9 and 10 are provided in head 5 for the connection of the boiler into the piping system. A similar opening 11 is shown in the shell 1. Vitreous enamel coatings 12 and 13 similar to the coating 4 of the shell 1 are applied respectively to the heads 5 and 6. These coatings are extended over the skirts 7 and 8 and preferably extend to their outer extremities.

The heads may be assembled with the enameled coatings in contact with the enameled coatings of the ends of the cylindrical shells or they may be assembled with thin sheets 14 and 15 of material such as asbestos between these coatings. Welds 16 and 17 extend annularly around the ends of the structure joining the shell section with the inverted heads and provide the strength to withstand the outward pressure of the liquid in the boiler and also seal the boiler against leakage of the liquid.

The thin insert sheets 14 and 15 are preferably composed of a heat resistant and relatively plastic or reformable material as compared to the material of the shell and head. Beside asbestos other materials such as woven strips made from glass fibres have also been found highly satisfactory. It is advantageous to apply the sheet in an adhering strip to the head circumferentially thereof in such a position on the head that by assembling the head in the shell and exerting a substantial pressure on the head to press it into the shell the strip will follow the head into the end of the shell until the outer edge 18 of the strip has passed a short distance beyond the outer edge 19 of the shell.

The space 20 between the weld 16 and the strip edge 18 provides a place for the two enamel coatings to fuse together under the heat applied in making weld 16. The enamel coatings are thus fused together excluding water from the position of the weld. Strip 14 acts as a closely fitting dam to exclude the flame of the arc or other welding means from the rest of the enamel and limits its fusion to the predetermined position as at 20.

Heat resistant pliable strip 14 serves to protect the enamel against injury while the head is being wedged under pressure into the shell which is caused by this pressure to conform to the contour of the head. The strip further slightly compresses or reforms to completely and tightly fill any small irregularities between the head and shell thus effectively closing up any possible paths for the circulation of liquid toward the outer enamel seal and joinder of the shell and head.

A modification of the invention is illustrated in Fig. 3 in which the shell 21 is shown with its protective coating 22. An inwardly extending bead 23 is formed in the shell 21 near the end and serves to support the head 24 when being assembled under pressure applied on the outside of the head. A protective coating 25 is applied to the head 24. As previously described the head is made to conform closely in shape to the shell for a substantial distance near the outer ends and may be assembled with coatings 22 and 25 in contact. There is, however, illustrated a protective sheet 26 of material such as asbestos between these coatings. An annular weld 27 joins the head and shell in a manner similar to that described with respect to weld 16.

A further modification is shown in Fig. 4 in which the inverted head 30 is made with its central portion formed outwardly to give more volume in the boiler than obtained in the other illustrations previously described. Strip 31 is secured to the head by welds 32 and 33 to limit the flexure that might occur in the bend of the head when internal pressure is applied. This member 31 can, however, be omitted when sufficient stiffness is provided in the head itself.

The following procedure is employed in the manufacture of the boiler illustrated in the drawing. The shell is formed into a cylindrical shape and the longitudinal meeting edges joined in abutting relation preferably by electric flash resistance welding. Any of the other known methods of joining the edges with a smooth interior may, however, be employed. A flare such as 2 or a head supporting bead such as 23 is then formed in the ends of the shell by pressing or by rolling. Heads 5 and 6 or other types of heads as for instance 24 or 30 are then formed preferably by pressing from sheet steel. Where openings are required in either the shell or head these are then provided. The skirts 7 and 8 of the heads conform closely to the shape of the flared ends of the shell.

The internal surfaces of the shell and heads are then provided with a corrosion resisting coating. In the preferred form which is a vitreous enamel coating these internal surfaces are preferably sprayed with the enamel frit. The frit can, however, be applied by dipping or other suitable methods. The frit coated parts are then placed in an oven or furnace where they are properly supported to minimize warping and heated to a temperature sufficient to fuse the enamel and produce a glazed enamel surface extending over those areas exposed to the contents of the boiler. The usual temperature employed is approximately 1600° F. A light coat of enamel has also been applied to the exterior of these parts simultaneously with the above described internal coatings to preserve such surfaces against any incidental rusting or other attack.

The internal protective enamel coatings are next thoroughly inspected for any flaws or imperfections. The inspection is readily accomplished at this point in the manufacture since the entire surfaces are easily accessible for such inspection. In case one of the enameled coatings is found to be imperfect it can be re-sprayed and fused and thereby occasion for scrapping the part due to such a defect is obviated.

The heads are then assembled in the shell either one at a time or both simultaneously. The assembly is made by placing the head in the shell preferably with the pliable strip therebetween and gradually applying pressure to the head to cause its close fitting skirt to deflect the flared end of the shell section so as to bring the surfaces in uniformly close fitting relationship. The attainment of this close fit is important since if any exposed area should finally exist at the outer extremities of these parts where they are later joined there is with a close fit a very restricted path through which the liquid would have to pass to reach these areas, and any corrosion that might take place would quickly fill such path with the products of corrosion thereby effectively excluding any further liquid from reaching such exposed area. The pressure employed in applying the heads is as much as one ton in the case of a range boiler or hot water tank. An important feature of the present construction is that the shaped shell ends and heads are such as to obtain the necessary tight fit without distorting the heads or shell beyond the elastic limit of the steel which would injure the enamel. Other pressed in container heads have in the past employed the plastic flow of the shell to make them tight.

After the heads are assembled in the shell they are welded thereto completely uniting the heads and shell and sealing the tank against leakage. The welding may be done while the pressure is still applied if any danger exists of the heads not remaining in position. This, however, is not necessary where the heads remain wedged in position as in the construction shown in Figures 1, 2 and 4. The skirt of the head is made to extend beyond the end of the shell far enough to receive the weld. The projection of the heads beyond the ends of the shell makes it possible to apply the two head welds 16 and 17 simultaneously. It is preferred to employ electric arc welding for the welds since the heat is thereby concentrated and does not extend far into the head or shell to cause warpage or affect the protective coatings. It is also found that this welding of the heads in the case of the vitreous enamel coatings causes the two opposed enamel coatings to flow and fuse together in the immediate vicinity of the welds. The fusing together of the enamel coatings of the shell and heads completes the closure of the vitreous protective coating thereby excluding the liquid from the weld areas and protecting the welds from corrosive attack.

The above described construction has been found to be advantageously employable in the use of other protective coatings, such as galvanizing. Many of the galvanized range boilers now in use have been made with defective inner coatings due to the difficulties of galvanizing and inspecting a closed boiler.

It will be understood also that the present invention can be applied where only one of the heads are of the inverted type described. By completing the enameling or coating of one loose, inverted type head and the remainder of the tank assembly as a second unit a thorough inspection of the enamel or other coating is made possible. The partial tank assembly or second unit can preferably be made by forming the cylindrical shell with one straight end onto which a convexed head of equal diameter may be welded in abutting relation either by flash resistance welding or any other suitable method. The interior of the welded area is then smoothed to present a suitable surface for enameling. The interior of the resultant shell and head assembly is then enameled and fired and the enamel coating inspected through the open end of the tank. An enameled inverted head is then forced into the flared open end of the tank and welded in place, as previously described in the three piece structure, to complete the tank.

The invention is claimed as follows:

1. In a hot water tank, an inverted head having a curved, pressure-resisting crown and a circumferential section extending substantially longitudinally of the tank, a shell section having an end portion formed to receive and support said circumferential section of said head in close fitting wedging relation under assembly pressure, said head and said shell having fused vitreous enamel protective linings bonded to the interior and meeting surfaces, a heat resisting pliable member between the overlapping portions of said head and said shell, and a weld near the outwardly extending edges of the head and shell to join them together and complete the closure at the outer edge of said overlapping portions.

2. A hot water tank, comprising a cylindrical shell section having an overlapping portion near its end shaped to support and tightly confine a head portion to be assembled with substantial assembly pressure, an inverted head having a pressure-resisting crown and a circumferential portion shaped to conform to said shell end, said head and said shell being protected on their inner surfaces by fused vitreous enamel coatings, a deformable filler member between said head and shell to protect the enamel coatings against injury in assembly and fill circumferentially the space between the overlapping portions thereof, and a weld joining the outer edges of said head and shell at the edge of said overlapping portions.

3. A hot water tank or like container, comprising a shell, an inverted pressure-resisting head disposed at one end of said shell with a circumferential portion overlapping a corresponding end portion of the shell in a direction substantially longitudinal of the tank, said shell and said head having fused vitreous enamel linings bonded to their inner and meeting surfaces, a protective filler member of reformable material in the space between the linings on the overlapping portions of the head and shell and disposed with its outer edge slightly inside of the outer edges of the shell and head, and a weld joining the shell and head at their outwardly extending edges, said enamel coatings being fused adjacent the weld to provide a continuous lining for the tank.

4. A hot water tank or like container, comprising a cylindrical shell having an outwardly flared portion extending substantially longitudinally of the tank near its end to receive a head in tightly fitting wedging relation, a pressure-resisting head with a skirt portion conforming in shape to said flared shell portion and the edge of the skirt disposed adjacent the end edge of the shell, said head and shell having protective coatings bonded to their inner surfaces, a protective member of deformable material between substantially the entire overlapping portions of said shell and head, and an annular weld joining the outer edges of the head and shell, said weld being protected from corrosion by said protective member restricting the passage of fluid to the weld from the body of the tank.

5. A hot water tank, comprising a cylindrical shell having an outwardly flared end portion to receive a head in wedging relation, an inverted pressure-resisting head with an outer portion conforming in shape to said flared shell and overlapped thereby, the head and shell having vitreous enamel protective coatings bonded to their interior surfaces, a protective filler member of deformable heat resisting material between the overlapping coatings of the head and shell and slightly removed from their outer edges, and a weld joining said outer edges of the overlapping portions of the shell and head, said enamel coatings being fused adjacent the weld to provide a continuous lining for the tank.

6. A three piece hot water tank, comprising a shell with a vitreous enamel coating interiorly thereof, tight fitting pressure-resisting inverted heads in the ends of said shell and closely engaging the enamel coating on said shell for a substantial distance from the end of the latter, a soft, enamel protecting filler member of deformable heat insulating material in the space between said shell and each of said heads, and welds joining the shell with the inverted heads near their outwardly extending extremities at a substantial distance from the body of the tank.

7. A two piece hot water tank, comprising a section with a shell and integrally attached head at one end of the shell and a vitreous enamel coating interiorly thereof, a tight fitting pressure-resisting inverted head in the other end of said shell and closely engaging the enamel coating on said shell for a substantial distance from the end of the latter, a soft, enamel-protecting filler member between said shell and inverted head, and a weld joining the shell with the inverted head near their outwardly extending extremities.

8. A hot water tank or like container, comprising a shell, a head formed with a circumferential part adapted to overlap a corresponding part of said shell with their edges adjacent, said head and said shell having vitreous enamel linings on their inner and overlapping meeting surfaces, a heat resisting pliable strip between the head and shell and arranged with its outer edge slightly inside of the outer edges of the shell and head, and a weld joining the shell and head at their outwardly extending edges.

OTTO E. UECKER.

CERTIFICATE OF CORRECTION.

Patent No. 2,263,021. November 18, 1941.

OTTO E. UECKER.

It is hereby certified that error appears in the printed specification of the above numbered patent requiring correction as follows: Page 3, second column, line 2, claim 2, for "an overlapping" read --a--; line 3, for "a" read --an overlapping--; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.